United States Patent
Carrig (12) 
(10) Patent No.: US 6,965,647 B1
(45) Date of Patent: Nov. 15, 2005

(54) ROBUST TIME DOMAIN BLOCK DECODING

(75) Inventor: James J. Carrig, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 345 days.

(21) Appl. No.: 09/724,740

(22) Filed: Nov. 28, 2000

(51) Int. Cl.[7] .............................................. H04B 1/66
(52) U.S. Cl. ........................ 375/240.27; 375/240.26; 375/240.12; 375/240.24; 375/240.18; 375/240.2; 382/268; 382/266; 382/233; 382/238; 382/248; 382/250; 358/426.04
(58) Field of Search .......................... 375/240.27, 240, 375/240.19, 240.18, 240.29, 240.28, 240.26, 375/240.12, 240.24, 240.2; 382/268, 275, 382/236, 232, 256, 254, 266, 233, 238, 248, 382/250; 348/425, 403, 384, 409; 358/426.04

(56) References Cited

U.S. PATENT DOCUMENTS

| | | | |
|---|---|---|---|
| 4,558,361 A * | 12/1985 | Catros ..................... 348/396.1 |
| 5,652,616 A | 7/1997 | Chen et al. ................... 348/43 |
| 5,757,969 A * | 5/1998 | Kim ............................ 382/256 |
| 5,937,101 A * | 8/1999 | Jeon et al. .................. 382/268 |
| 5,983,172 A | 11/1999 | Takashima et al. ......... 704/203 |
| 6,078,616 A * | 6/2000 | Ozcelik et al. ............. 375/240 |
| 6,125,147 A * | 9/2000 | Florencio et al. ....... 375/240.29 |
| 6,285,716 B1 * | 9/2001 | Knee et al. ............ 375/240.28 |
| 6,373,894 B1 * | 4/2002 | Florencio et al. ....... 375/240.19 |

OTHER PUBLICATIONS

International Search Report PCT/US01/47960, Apr. 23, 2002, 1pp.

* cited by examiner

*Primary Examiner*—Shawn S. An
(74) *Attorney, Agent, or Firm*—Blakely, Sokoloff, Taylor & Zafman LLP (57) ABSTRACT

A method for robust time domain block decoding is disclosed. In one embodiment, the method includes receiving a block of transform domain coefficients, detecting errors in one or more transform domain coefficients, decoding pixel values from the transform domain coefficients, determining a first estimate for each erroneous pixel value, and updating the decoded pixel values.

15 Claims, 7 Drawing Sheets

ROBUST TIME DOMAIN BLOCK DECODING

FIELD OF INVENTION

This invention is related to the field of signal transmission and error recovery.

BACKGROUND OF THE INVENTION

Common techniques for image compression, such as MPEG and JPEG, rely on blocked transforms. Though good for compression, these standard methods do not offer robust reconstruction techniques. Real world images tend to concentrate most of their energy in the low frequency bands. That is, most of the information content is stored in the low frequency coefficients of the transformed image. Packing this information into these relatively few coefficients has proved advantageous in image compression algorithms. Providing that these low frequency coefficients are transmitted correctly, an image can be recovered with high fidelity.

However, the cost of transforming an N-by-N image segment to or from the frequency domain requires approximately 2 $N^3$ operations. If N is large, this becomes infeasible. To keep the complexity manageable, N is usually chosen to be a small number, e.g. 8, and the image is transformed one block at a time. In this way, the number of operations grows only linearly with the size of the image.

Block transforms which are also unitary are particularly attractive for transform encoding of an image because the mean-square contribution of a coefficient in the frequency domain equals its mean-square contribution in the time domain. For the encoder, this means that the larger a coefficient's magnitude is in the frequency domain, the larger its contribution to the time domain reconstruction. In the same way, errors in the frequency domain correspond in magnitude to errors in the time domain.

One drawback of the conventional transform encoding methods is that they are not robust to errors. This lack of robustness is partially attributable to the variable length methods of compression usually used in the encoding, and partially attributable to the lack of correlation between components in the frequency domain. The loss of synchronization due to variable length coding can be overcome by adding resynchronization points, or by using a pseudo-fixed length encoding. However, the lack of correlation in the frequency domain is a more fundamental problem that has not been adequately addressed by conventional encoding methods.

Other researchers, notably Edward Chang and Keng-Kuan Lin, "Error Concealment and Reconstruction Schemes for Image Transmission on a Wireless Network," Stanford University, March 1997 and Sheila S. Hemami, "Reconstruction-Optimized Lapped Orthogonal Transforms for Robust Image Transmission," Cornell University, April 1996, have investigated the problem of lack of correlation in the frequency domain in the past. These researchers addressed this problem by estimating lost frequency components using weighted averages of corresponding components from surrounding blocks.

However, this process is fundamentally limited by the ever decreasing correlation encountered with increasing block size. For example, if the DC component is damaged, trying to estimate it by averaging surrounding DC coefficients is similar to estimating a lost pixel from a small image by averaging surrounding pixels. Because the image formed from the DC components is small compared to the original, the spatial correlation is low. Therefore, the averaging process is not effective.

SUMMARY OF THE INVENTION

A method for robust time domain block decoding is disclosed. In one embodiment, the method includes receiving a block of transform domain coefficients, and associated error flags, decoding pixel values from the transform domain coefficients, determining a first estimate for each erroneous pixel value, and updating the decoded pixel values.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method for robust time domain block decoding is disclosed. In one embodiment, the method includes receiving a block of transform domain coefficients, and corresponding error flags, decoding pixel values from the transform domain coefficients, determining a first estimate for each erroneous pixel value, solving a constrained minimizing problem and updating the decoded pixel values.

To overcome the problem of lack of correlation in the frequency domain, the method for robust time domain block decoding reformulates the loss in the time domain and then exploits the correlation of the highest possible resolution to recover each lost coefficient. Because the highest resolution data is used regardless of the block size, the performance does not decrease with increasing block size.

Robust time domain block decoding implements a robust method for decoding block data in the time domain to reduce the effect of errors. Unlike previous methods, the transform used in robust time domain block decoding is based on a time domain formulation parameterized by scalar coefficients that can be estimated by solving a least squares problem. Examples of block transforms that can be included in the method to perform robust time domain block decoding include the DCT and the Haar Wavelet Transform.

The mathematical formulation used to describe robust time domain block decoding is discussed below. To facilitate this discussion, the following notation is reviewed. Boldface type is used to indicate a matrix or vector and regular type is used to indicate components. For example, $A \in R^{N \times N}$ indicates that A is a N-by-N matrix with real components $A_{i,j}$, $i,j \in \{0,1, \ldots, N-1\}$. A superscript T, such as $A^T$ indicates transposition. The inverse of A is $A^{-1}$ and the inverse of the transposition of A is $A^{-T}$.

Time Domain Formulation

Let $X \in R^{N \times N}$ be a matrix of pixels, $H \in R^{N \times N}$ be a non-singular transformation matrix, and $Y \in R^{N \times N}$ be the result of the following transformation:

$$Y = H \times H^T \tag{1}$$

$N^2$ indicator matrices $C^{(k)} \in R^{N \times N}$ are defined as $$C^{(k)}_{i,j} = \begin{cases} 1 & : \text{if } k = iN + j \\ 0 & : \text{otherwise} \end{cases} \tag{2}$$

and the vector y with $N^2$ components is defined as a one-dimensional rearrangement of the matrix Y such that $$y_k = Y_{i,j},\ k = iN + j \tag{3}$$

The matrix Y may be expanded as in terms of the vector y and the indicator matrices:

$$Y = \sum_{k=0}^{N^2-1} y_k C^{(k)}. \tag{4}$$

Inverting Eq. (1) and substituting Eq. (4), the image portion X may be recovered from the transformed pixels Y in the following way.

$$X = H^{-1} Y H^{-T} \tag{5}$$

$$= H^{-1} \left( \sum_{k=0}^{N^2-1} y_k C^{(k)} \right) H^{-T} \tag{6}$$

$$= \sum_{k=0}^{N^2-1} y_k (H^{-1} C^{(k)} H^{-T}) \tag{7}$$

$$= \sum_{k=0}^{N^2-1} y_k P^{(k)} \tag{8}$$

$P^{(k)} \in R^{N \times N}$ is a rank one matrix attained from the outer product of columns i and j of the matrix $H^{-1}$ where $k = iN + j$, $i, j = 0, \ldots N-1$. In the important special case when H is unitary, then $$H^{-1} = H^T \Longrightarrow P_{p,q}^{(k)} = H_{i,p} H_{j,q}\ k = iN + j \tag{9}$$

Eq. (8) is the basis for robust reconstruction. Suppose that some of the $y_k$ pixels have been lost in the communication channel. Neighboring relations from the decoded domain can be used to estimate the missing $y_k$.

Least Squares Recovery

Let $I = \{k_0, k_1, \ldots, k_{M-1}\}$ be a set containing the indices of the M unknown values of Y. Then, separate X into the known and unknown portions.

$$X = \sum_{k \notin I}^{N^2-1} y_k P^{(k)} + \sum_{k \in I}^{N^2-1} y_k P^{(k)} \tag{10}$$

$$= \hat{X} + \sum_{k \in I}^{N^2-1} y_k P^{(k)} \tag{11}$$

Although $\hat{X}$ and $P^{(k)}$ are known, X is not and $y_k$ cannot be solved directly. To overcome this, E(X), the expected value of X, is determined, based on local correlations, and is used in place of X.

Because the prediction of the executed value is not perfect, Eq. (11) may not have a solution. Instead the following least squares problem is solved.

Least Squares Problem

Given a partial decoding $\hat{X} \in R^{N \times N}$, a predicted decoding $E(X) \in R^{N \times N}$, and a set of pre-determined matrices $P^{(k)}$, find $y_k, \forall k \in I$ that minimizes $$\left\| \hat{X} + \sum_{k \in I}^{N^2-1} y_k P^{(k)} - E(X) \right\|_F^2 \tag{12}$$

where the subscript F indicates the Frobenius norm.

The solution of Eq. (12) is easily seen by rearranging the terms in vector form, where the Frobenius norm corresponds to the usual vector-2 norm. Let $\alpha = [y_{k0}, y_{k1}, \ldots, y_{kM-1}] \in R^M$ be a column vector of the unknown values of Y, and let x and $\hat{x}$ be vector versions of X and $\hat{X}$, respectively. The vector can now be expressed as the sum of a known vector, $\hat{x}$ and a matrix-vector product $$x = \hat{x} + F\alpha \tag{13}$$

where column $j \in \{0, \ldots, M-1\}$ of F contains components of $P^{(k)}$ rearranged in vector form. The minimization problem can now be written in terms of the unknown vector, $\alpha$. The function $f(\alpha)$ is minimized:

$$f(\alpha) = \|\hat{x} + F\alpha - E(x)\|_2^2 \tag{14}$$

$$= (\hat{x} + F\alpha - E(x))^T (\hat{x} + F\alpha - E(x)) \tag{15}$$

$$= [F\alpha + (\hat{x} - E(x))]^T [F\alpha + (\hat{x} - E(x))] \tag{16}$$

$$= \alpha^T (F^T F) \alpha + 2(\hat{x} - E(x))^T F\alpha + (\hat{x} - E(x))^T (\hat{x} - E(x)) \tag{17}$$

At the unconstrained minimum, the gradient vanishes.

$$f'(\alpha) = 2(F^T F)\alpha + 2(\hat{x} - E(x))^T F = 0 \tag{18}$$

Therefore, an $\alpha$ that satisfies the following equation is determined.

$$(F^T F)\alpha = F^T (E(x) - \hat{x}) \tag{19}$$

Solution of Eq. (19) requires $O(M^3)$ floating point operations.

Determination of E(X)

To solve Eq. (12), it is necessary to have a first prediction of E(X). To keep the complexity reasonable, E(X) would likely be a unconstrained estimate of X based on surrounding pixels. This unconstrained estimate is used in Eq. (12) to estimate the missing $y_k$ coefficient values, so that the reconstructed X is constrained to be a sum of the known and unknown terms of X as formulated in Eq. (11).

Figure 1:
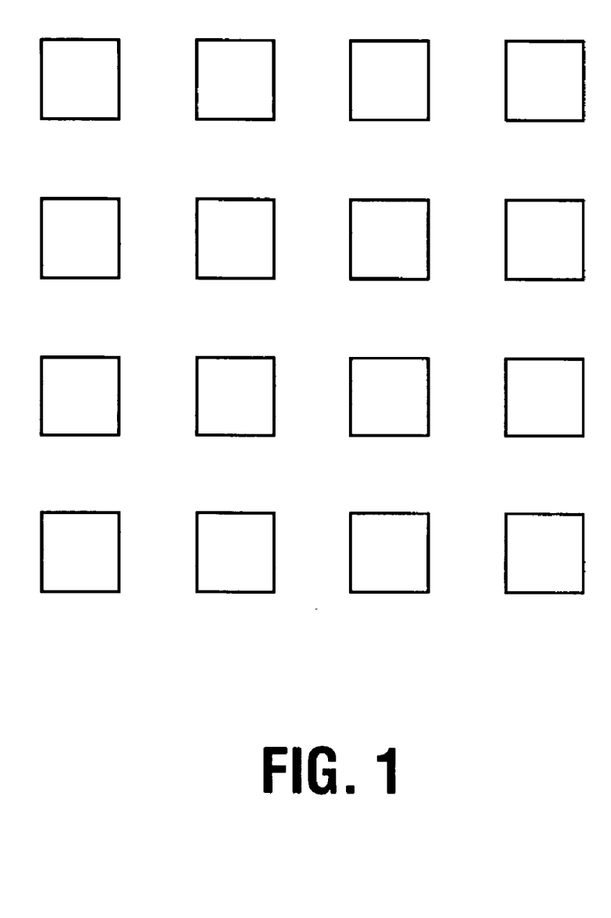
FIG. 1 shows an embodiment of a block of image data.
Figure 2:
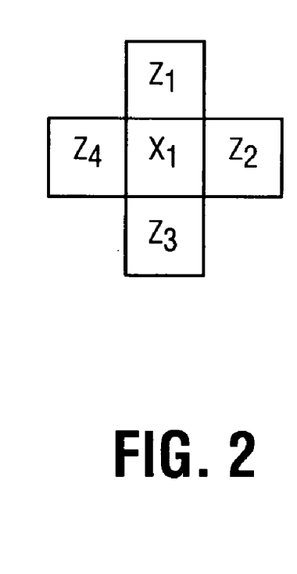
FIG. 2 shows an embodiment of a pixel adjacent to pixels from other blocks.

The robustness of the decoder comes from the fact that an entire block of data is used to estimate each value of $y_k$. Nevertheless, the predicted value for E(X) should be reasonably close to the actual expected value estimates of $y_k$. A simple and effective method to determine E(X) is to form each image block by mapping subsamples of the image to the block and to use the average of adjacent pixels as the estimate for the missing pixel. This method is improved if the encoder uses a subsample block structure as indicated in FIG. 1. The transform block of FIG. 1 includes samples from every other pixel of the image in both the horizontal and vertical directions. As indicated in FIG. 2, each pixel of E(X) may be calculated as the average of adjacent pixels, which are taken from other blocks. For example, a pixel, $x_1$, may be estimated using adjacent pixels $z_1$, $z_2$, $z_3$, and $z_4$ from other blocks.

Recovery Method

Figure 3:
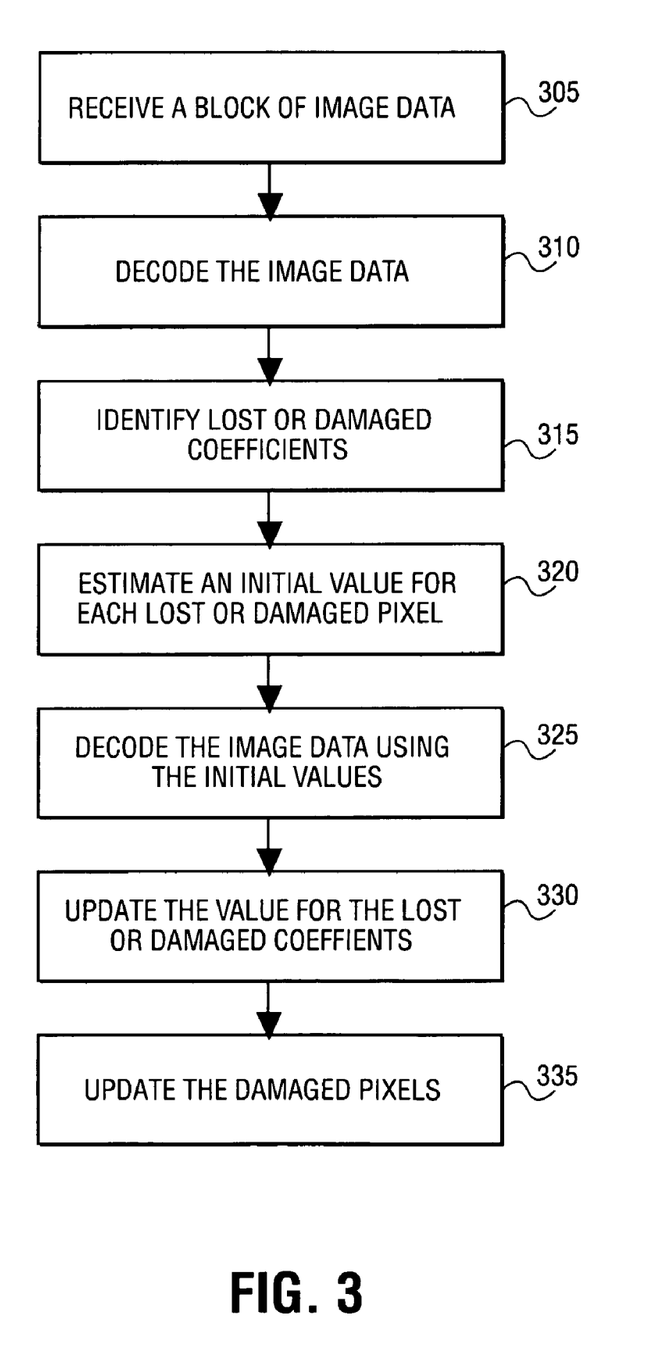
FIGS. 3 and 4 show embodiments of a method for recovering lost data.

A method for recovering lost data is shown in FIG. 3. A block of encoded image data is received by a decoder, 305. The image data is encoded in the transform domain, and is represented by transform domain coefficients. Some of the transform domain coefficients may be lost or damaged during transmission. Therefore, when the image is decoded, pixel values derived from the lost or damaged coefficients will be lost or damaged, 310. Each lost or damaged coefficient is identified, 315. An initial estimated value for each lost or damaged pixel is determined, 320. In one embodiment, the estimated pixel value is the expected value estimate, which is the average of the pixels adjacent to the lost or damaged pixel, as discussed above. This estimated pixel value is used to determine an initial value for each corresponding lost or damaged transform domain coefficient. The block of encoded image data is then decoded using the initial values of the transform domain coefficients, 325.

An updated value for each lost or damaged coefficient is then determined, 330. The updated coefficient value may be determined by minimizing a least squares problem. For example, an estimate of a that satisfies $$(F^T F)\alpha = F^T (E(x) - \hat{x})$$   Equation (19)

can be determined. This estimate of $\alpha$ can be used to update the estimates for the damaged pixel values, 335. Updating the pixel values may be performed by using $$x = \hat{x} + F\alpha$$   Equation (13)

as discussed above. Therefore, updated estimates for the lost or damaged coefficients $Y_k$ can be determined using $$X = \hat{X} + \sum_{k \in I}^{N^2 - 1} y_k p^{(k)}$$   Equation (11)

However, one or more pixels adjacent to a lost or damaged pixel may also be lost or damaged. The lost or damaged pixels adjacent to a given lost or damaged pixel will reduce the accuracy of the initial executed value estimate of the given lost or damaged pixel. Therefore, iterating the method of FIG. 3 over the entire image will further improve the estimated value.

Refinement of E(X)

If the pixels adjacent to pixels of X are error-free, then E(X) is easily determined. However, the adjacent pixels may also be erroneous. In this case, one iteration of the method of FIG. 3 over the entire image will improve these damaged adjacent pixels. Improvement in these pixels will yield a corresponding improvement in E(X). This enables a resolution of Eq. (12), to calculate improved values of $y_k$. Thus, when adjacent blocks contain errors, iteration on the entire image may yield improvement to the image.

Alternative Recovery Method

Figure 4:
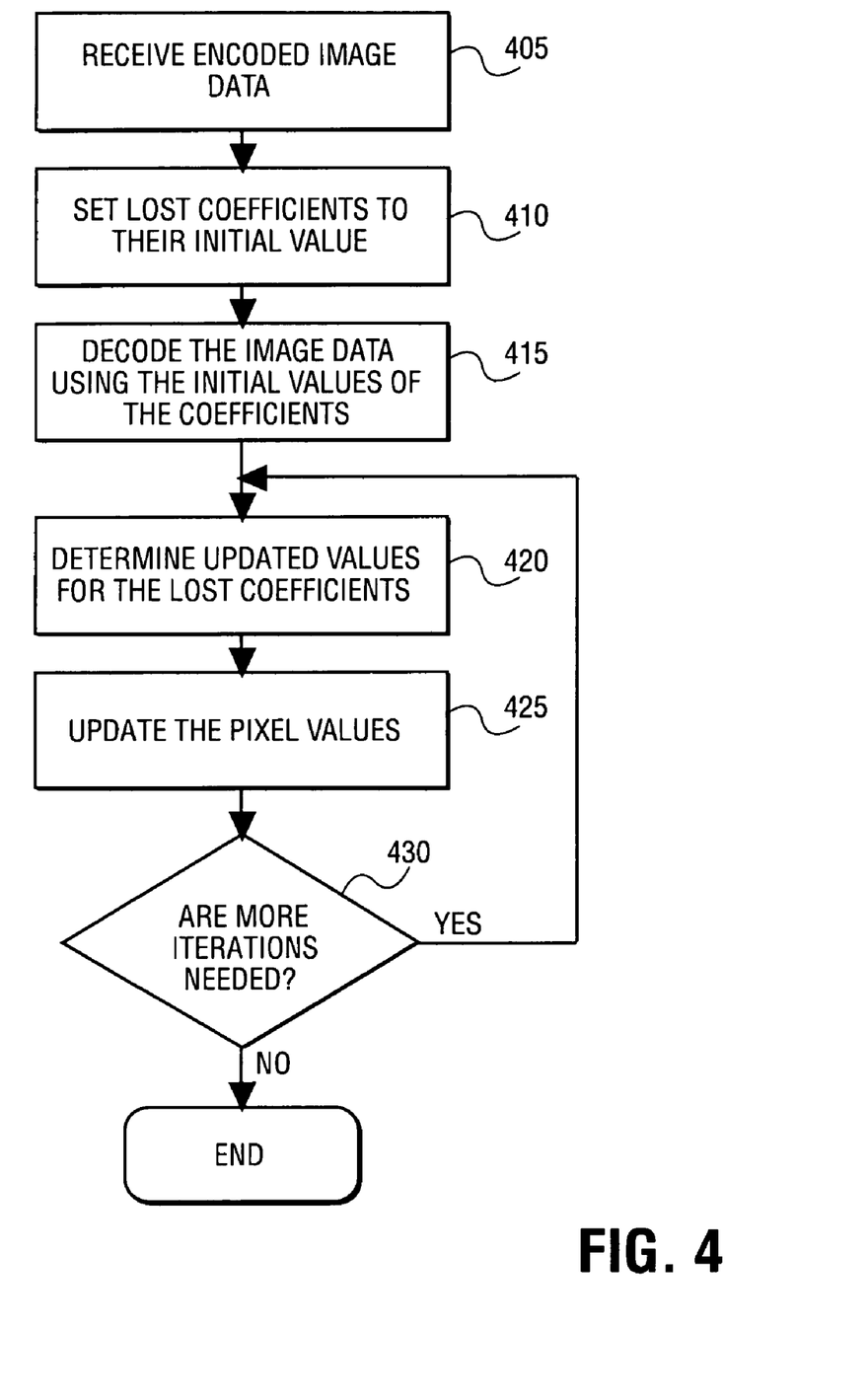

Based on the previous equations, another embodiment of a robust decoding algorithm is shown in FIG. 4. The method of FIG. 3 is repeated for a given number of iterations. The encoded image data is received by the decoder in the transform domain, 405. The damaged or lost coefficients for each block of the image are initially set to their expected value, 410. The image data is decoded using the initial values of the coefficients, 415. Then, for each block, updated values for the lost or damaged coefficients are determined, 420.

The updated values are used to update the pixel values of the decoded image, 430. A delay may occur to enable updated values for each block of the image to be determined, 435. Steps 405 through 435 may then be repeated to further improve the decoded image for a given number of iterations, 440.

Figure 5:
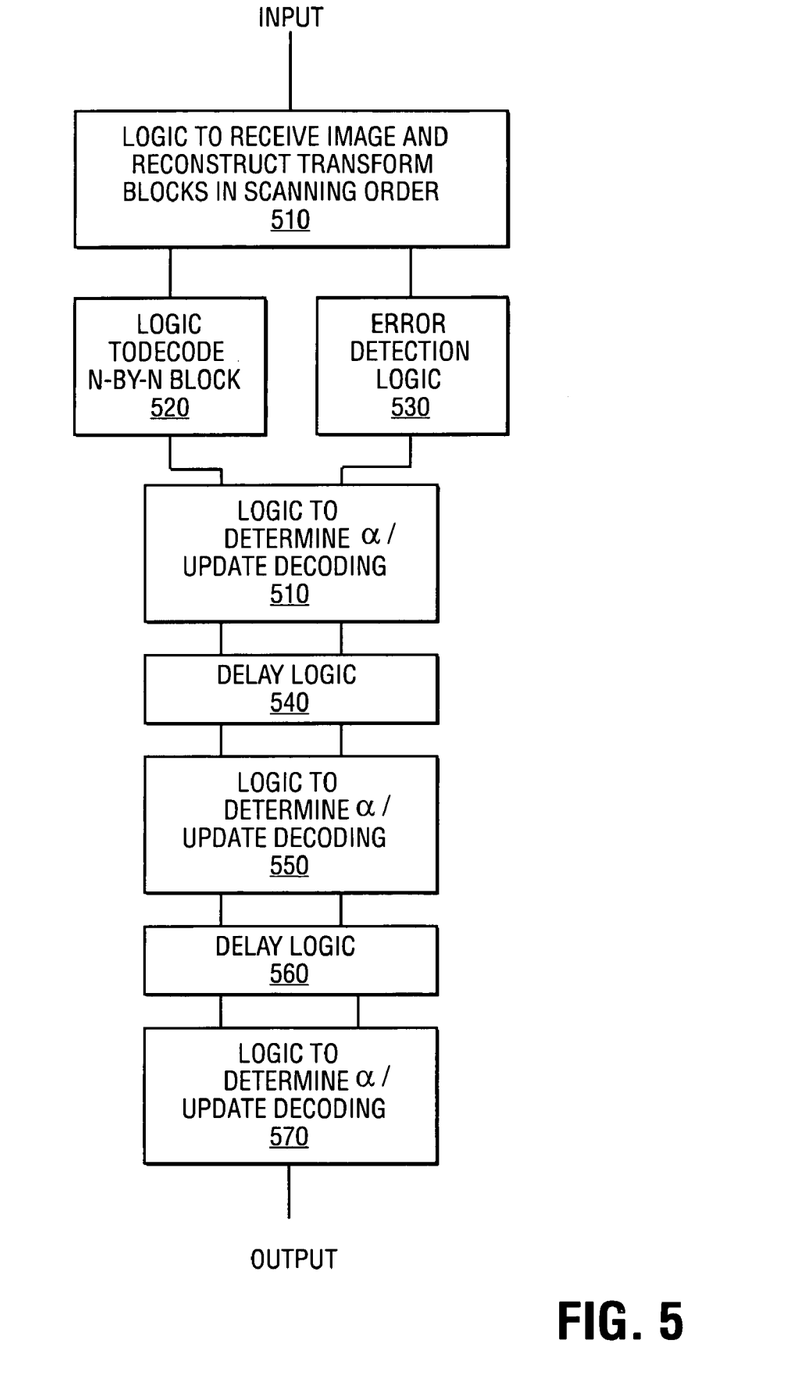
FIG. 5 shows an embodiment of a device to recover lost data corresponding to the method in FIG. 4.

The method of FIG. 4 uses a fixed number of iterations which makes for a simple hardware implementation of a decoder using a cascade structure, as shown in FIG. 5. The delays may be included in the system to allow time for the neighboring blocks to be updated before E(X) is recomputed. However, it is not necessary to rigidly adhere to a prescribed number of iterations. Iteration may be stopped at any time without harm. Furthermore, if there are no adjacent block errors, the iteration has no effect.

As shown in FIG. 5, input image data is received by logic 510 which receives the image and reconstructs the transform blocks in the scanning order. The reconstructed image is sent to logic 520, which decodes each N by N block. Also, logic 530 detects any errors present in the N by N block. The block is received by logic 540 which determines updated values for the transform block. Delay logic 540 enables time for the neighboring blocks to be decoded before further refining the updated values of the N by N block. Then, logic 550 updates the values of the transform block using data from the neighboring blocks to enhance the resolution. Delay logic 560 enables time for the neighboring blocks to be decoded, and logic 570 updates the values of the N by N block again, then outputs the image data.

Hardware Overview

Figure 6:
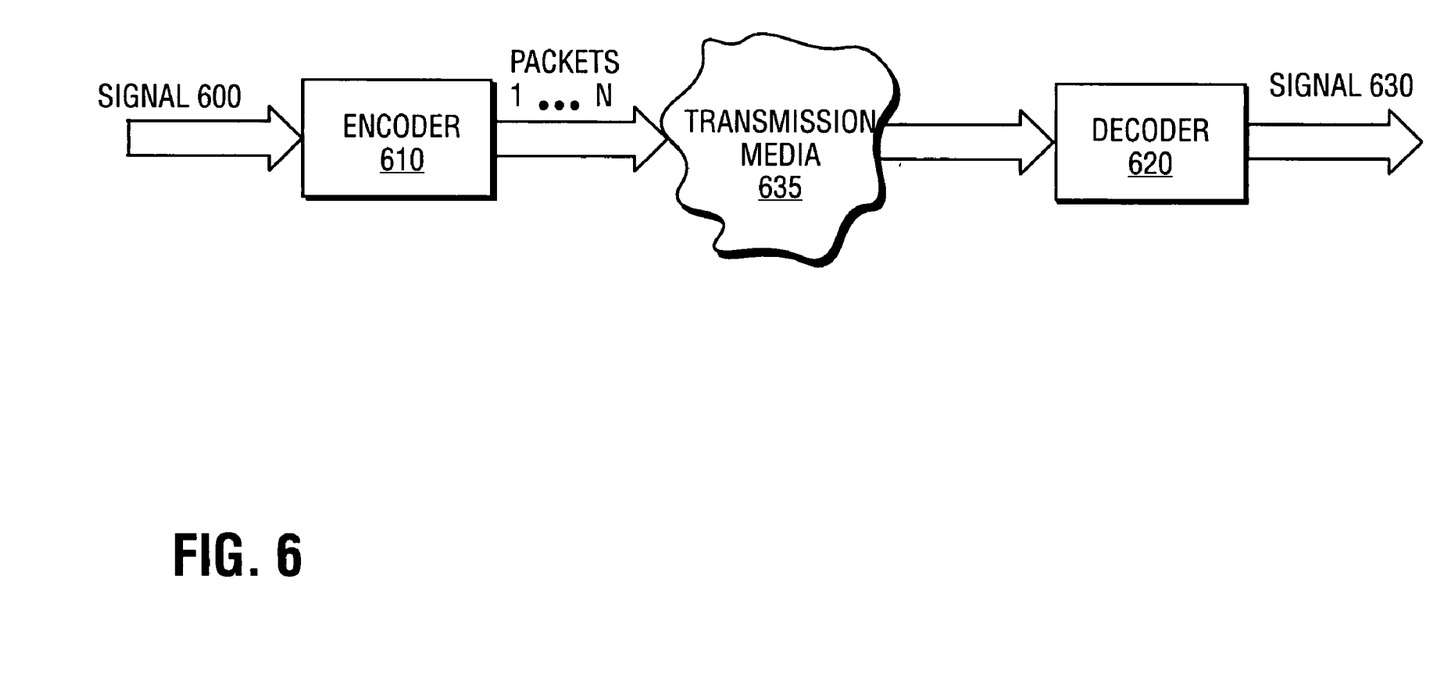
FIG. 6 shows an embodiment of a system that includes a device to recover lost data.

The signal encoding, transmission, and subsequent decoding are performed by the apparatus illustrated in FIG. 6. Signal 600 is a data stream input to Encoder 610. Encoder 610 follows a compression algorithm, such as an Adaptive Dynamic Range Coding ("ADRC") compression algorithm for example. A further description of ADRC encoding and buffering is disclosed in U.S. Pat. No. 4,722,003 entitled "High Efficiency Coding Apparatus" and U.S. Pat. No. 4,845,560 also entitled "High Efficiency Coding Apparatus", assigned to the assignee of the present invention. The encoder generates Packets 1, . . . N for transmission along Transmission Media 635. Decoder 620 receives Packets 1, . . . N from Transmission Media 635 and generates Signal 630. Signal 630 is a reconstruction of Signal 600.

Encoder 610 and Decoder 620 can be implemented a variety of ways to perform the encoding and decoding functions. In one embodiment, Encoder 610 and/or Decoder 620 are embodied as software stored on media and executed by a general purpose or specifically configured computer system, typically including a central processing unit, memory and one or more input/output devices and co-processors. Alternatively, the Encoder 610 and/or Decoder 620 may be implemented as hardware logic circuits to perform these functions. In addition, Encoder 610 and/or Decoder 620 can be implemented as a combination of hardware, software or firmware. Furthermore, the decoder shown in FIG. 5 may be used to implement decoder 610 shown in FIG. 6.

In one embodiment, Signal 600 is a color video image having a sequence of video frames, each frame including information representative of an image for an interlaced video system. Each frame is composed of two fields, wherein one field contains data of the even lines of the image and the other field containing the odd lines of the image. The data includes pixel values which describe the color components of a corresponding location in the image. For example, in one embodiment, the color components consist of the luminance signal Y, and color difference signals U, and V. It is readily apparent that the process of the present invention can be applied to signals other than interlaced video signals. Furthermore, it is apparent that the present invention is not limited to implementations in the Y, U, V color space, but can be applied to images represented in other color spaces.

Referring back to FIG. 6, Encoder 610 divides the Y, U, and V signals and processes each group of signals independently in accordance with the compression algorithm. The following description, for purposes of simplifying the discussion, describes the processing of the Y signal; however, the encoding steps are replicated for the U and V signals.

In one embodiment, Encoder 610 groups Y signals across two subsequent frames, referred to herein as a frame pair, of Signal 600 into three dimensional blocks ("3D") blocks. For one embodiment, a 3D block is generated from grouping two 2D blocks from the same localized area across a given frame pair, wherein a two dimensional 2D block is created by grouping localized pixels within a frame or a field. It is contemplated that the process described herein can be applied to different block structures. The grouping of signals will be further described in the image-to-block mapping section below.

In one embodiment, a single frame includes 5280 2D blocks wherein each 2D block comprises 64 pixels. Thus, a frame pair includes 5280 3D blocks as a 2D block from a first frame and a 2D block from a subsequent frame are collected to form a 3D block.

Image-to-Block Mapping

Figure 7:
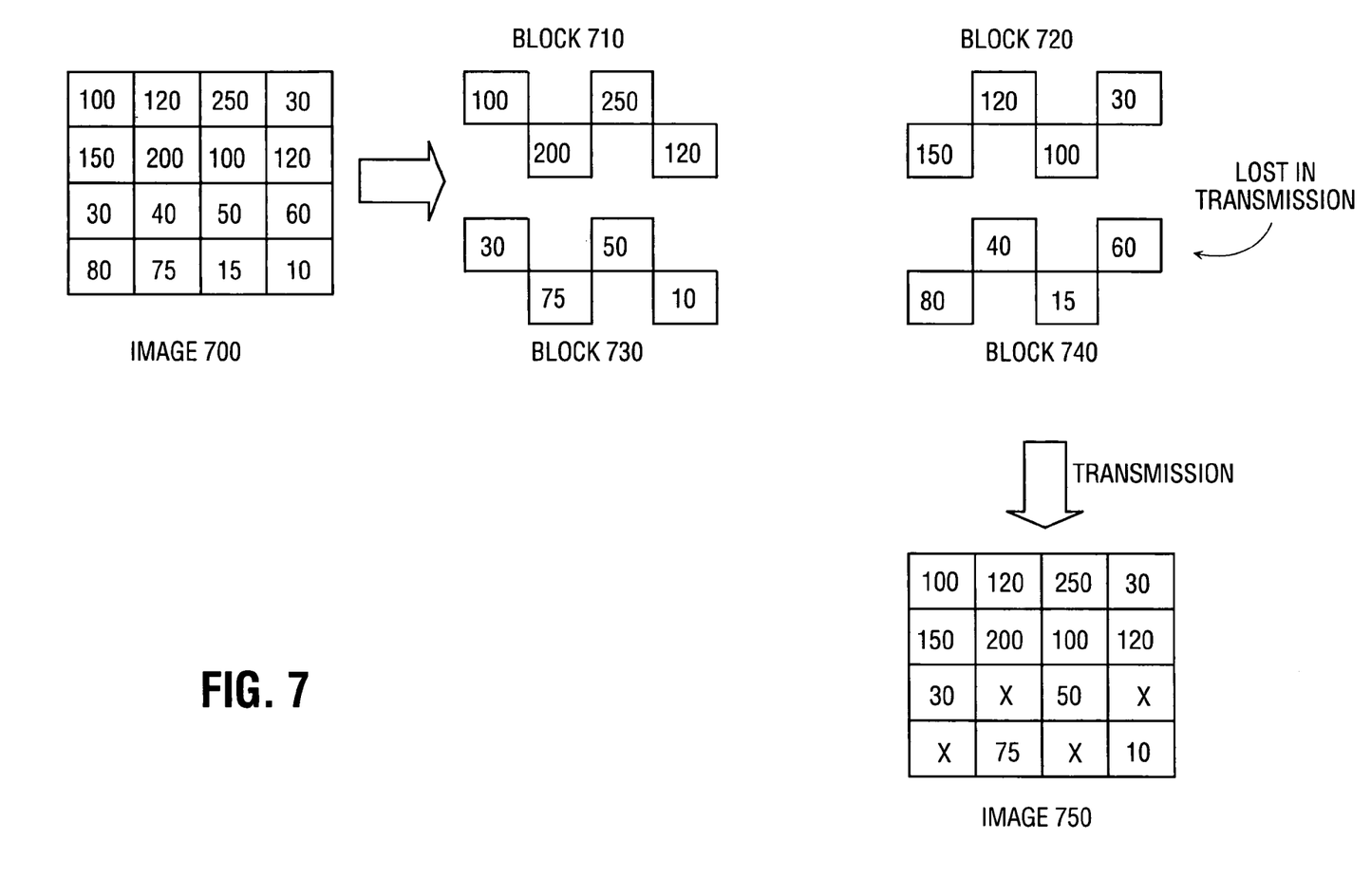
FIG. 7 shows an embodiment of an image to block mapping.
Figure 8:
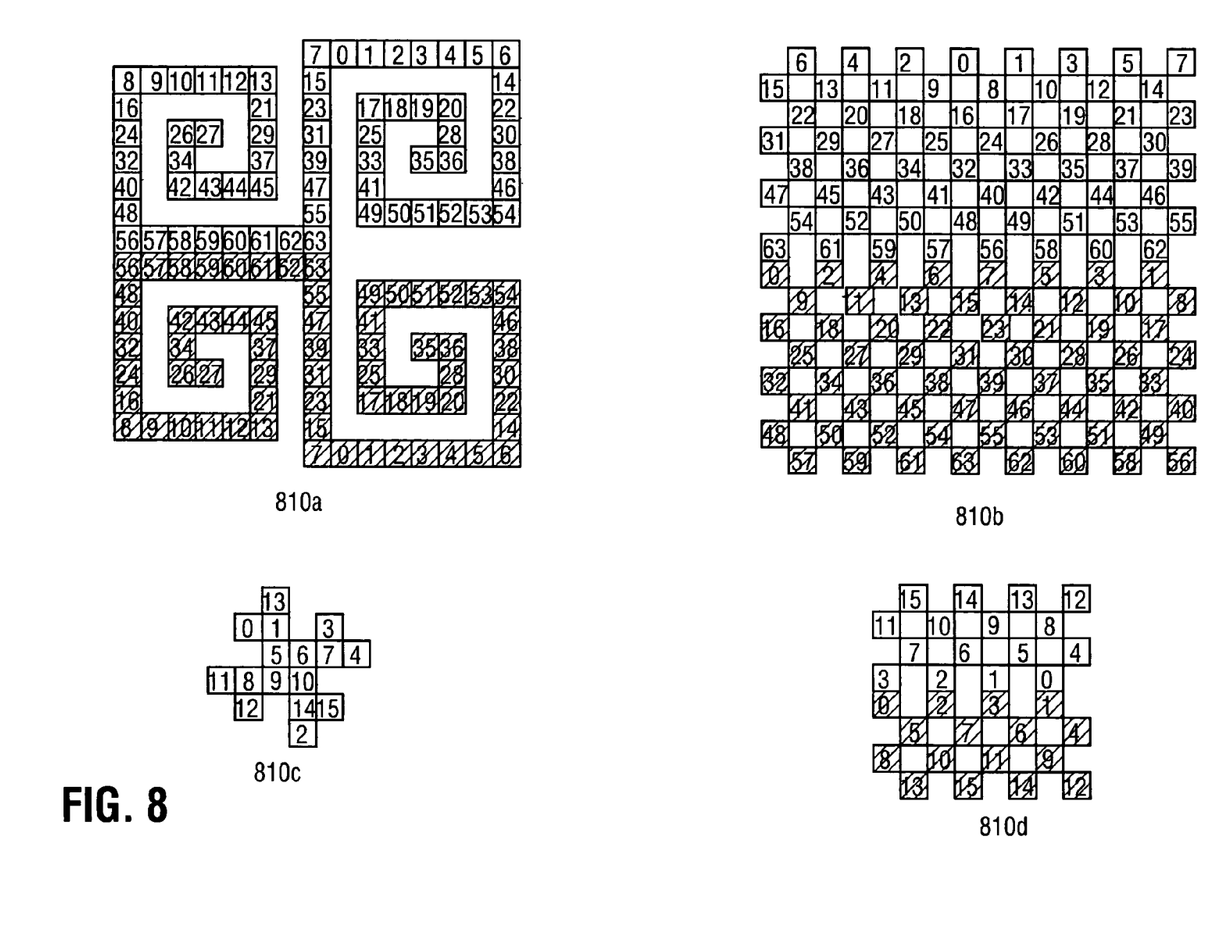
FIG. 8 shows another embodiment of an image to block mapping.

The subsample block structure of FIG. 1 used to estimated E(X) can be formed by mapping subsamples of an image to the block structure, as shown in FIGS. 7 and 8. Image-to-block mapping is performed for the purpose of dividing a frame or frame set of data into 2D blocks or 3D blocks respectively. Moreover, image-to-block mapping includes using a complementary and/or interlocking pattern to divide pixels in a frame to facilitate robust error recovery during transmission losses.

FIG. 7 illustrates one embodiment of an image-to-block mapping process for an exemplary 16 pixel section of an image. Image 700 comprises 16 pixels forming a localized area of a single frame. Each pixel in Image 700 is represented by an intensity value. For example, the pixel in the top left hand side of the image has an intensity value equal to 100 whereas the pixel in the bottom right hand side of the image has intensity value of 10.

In one embodiment, pixels from different areas of Image 700 are used to create 2D Blocks 710, 720, 730, and 740. 2D Blocks 710, 720, 730, and 740 are encoded, shuffled (as illustrated below), and transmitted. Subsequent to transmission, 2D Blocks 710, 720, 730, and 740 are recombined and used to form Image 750. Image 750 is a reconstruction of Image 700.

To ensure accurate representation of Image 700 despite a possible transmission loss, FIG. 7 is an interlocking complementary block structure, one embodiment of which is illustrated in FIG. 7, is used to reconstruct Image 750. In particular, the pixel selection used to create 2D Blocks 710, 720, 730, and 740 ensures that a complementary and/or interlocking pattern is used to recombine the blocks when Image 750 is reconstructed. Accordingly, when a particular 2D block's attribute is lost during transmission, contiguous sections of Image 750 are not distorted during reconstruction.

FIG. 1 and FIG. 8 illustrate other complementary and interlocking 2D block structures. Other structures may also be utilized. Similar to FIG. 7, these 2D block structures illustrated in FIG. 8, ensure surrounding 2D blocks are present despite transmission losses for a given 2D block. However, Patterns 810a, 810b, and 810d use horizontal and/or vertical shifting during the mapping of pixels to subsequent 2D blocks. Horizontal shifting describes shifting the tile structure in the horizontal direction a predetermined number of pixels prior to beginning a new 2D block boundary. Vertical shifting describes shifting the tile structure in the vertical direction a predetermined number of pixels prior to beginning a new 2D block boundary. In application, horizontal shifting only may be applied, vertical shifting may only be applied, or a combination of horizontal and vertical shifting may be applied.

Pattern 810a illustrates a spiral pattern used for image-to-block mapping. The spiral pattern follows a horizontal shifting to create subsequent 2D blocks during the image-to-block mapping process. Patterns 810a and 810d illustrate complementary patterns wherein pixel selection is moved by a horizontal and vertical shifting to create subsequent 2D blocks during the image-to-block mapping process. Further, Patterns 810b and 810d illustrate alternating offsets on pixels selection between 2D blocks. Pattern 810c illustrates using an irregular sampling of pixels to create a 2D block for image-to-block mapping. Accordingly, the image-to-block mapping follows any mapping structure provided a pixel is mapped to a 2D block only once.

FIG. 7 and FIG. 8 describe image-to-block mapping for 2D block generation. It is readily apparent that the processes are applicable to 3D blocks. As described above, 3D block generation follows the same boundary definition as a 2D block, however the boundary division extends across a subsequent frame resulting in a 3D block. In particular, a 3D block is created by collecting the pixels used to define a 2D block in a first frame together with pixels from a 2D block in a subsequent frame. In one embodiment, both pixels in the 2D block from the first frame and the 2D block from the subsequent frame are from the exact same location.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A method comprising:

receiving a block of transform domain coefficients and corresponding error flags, wherein at least one coefficient is erroneous due to transmission of the coefficients;

estimating an initial value for each erroneous coefficient;

decoding the erroneous coefficients of the block into estimated pixel values using the initial values of the coefficients to create predicted decodings of the block where there are errors in the coefficients and decoding non-erroneous coefficients of the block into error-free pixel values using received values of the coefficients to create partial decodings of the block where there are no errors in the coefficients;

updating the value for each erroneous coefficient based on the partial and predicted decodings of the block; and updating the estimated pixel values of the block using the updated values of the coefficients.

2. The method of claim 1, wherein estimating an initial value further comprises estimating the expected value of each erroneous coefficient.

3. The method of claim 1, wherein decoding erroneous and non-erroneous coefficients further comprises applying the transform domain coefficients to an inverse transform.

4. The method of claim 1, wherein updating the value for each erroneous coefficient further comprises minimizing a least squares equation.

5. The method of claim 1 further comprising:

displaying the pixel values.

6. An apparatus comprising:

means for receiving a block of transform domain coefficients and corresponding error flags, wherein at least one coefficient is erroneous due to transmission of the coefficients;

means for estimating an initial value for each erroneous coefficient;

means for decoding the erroneous coefficients-of the block into estimated pixel values using the initial values of the coefficients to create predicted decodings of the block where there are errors in the coefficients and decoding non-erroneous coefficients of the block into error-free pixel values using received values of the coefficients to create partial decodings of the block where there are no errors in the coefficients;

means for updating the value for each erroneous coefficient based on the partial and predicted decodings of the block; and means for updating the estimated pixel values of the block using the updated values of the coefficients.

7. The apparatus of claim 6, wherein said means for estimating an initial value further comprises means for estimating the expected value of each erroneous coefficient.

8. The apparatus of claim 6, wherein said means for decoding the erroneous coefficients and the non-erroneous coefficients further comprises means for applying the transform domain coefficients to an inverse transform.

9. The apparatus of claim 6, wherein said means for updating the value of each erroneous coefficient further comprises means for minimizing a least squares equation.

10. The apparatus of claim 6 further comprising:

means for displaying the pixel values.

11. A computer readable medium having instructions which, when executed by a processing system, cause the system to:

receive a block of transform domain coefficients and corresponding error flags, wherein at least one coefficient is erroneous due to transmission of the coefficients;

estimate an initial value for each erroneous coefficient;

decode the erroneous coefficients of the block using the initial values of the coefficients to create predicted decodings of the block where there are errors in the coefficients and decoding non-erroneous coefficients of the block into error-free pixel values using received values of the coefficients to create partial decodings of the block where there are no errors in the coefficients;

update the value for each erroneous coefficient based on the partial and predicted decodings of the block; and update the estimated pixel values of the block using the updated values of the coefficients.

12. The medium of claim 11, wherein the executed instructions further cause the system to:

estimate the initial value by estimating the expected value of each erroneous coefficient.

13. The medium of claim 11, wherein the executed instructions further cause the system to:

decode the erroneous and non-erroneous coefficients by applying the transform domain coefficients to an inverse transform.

14. The medium of claim 11, wherein the executed instructions further cause the system to:

update the estimated value for each erroneous coefficient by minimizing a least squares equation.

15. The medium of claim 11 wherein the executed instructions further cause the system to:

display the pixel values.

* * * * *